United States Patent
Funk et al.

(10) Patent No.: US 11,680,142 B2
(45) Date of Patent: Jun. 20, 2023

(54) PROCESS FOR PRODUCING SUPERABSORBENT POLYMER PARTICLES

(71) Applicant: BASF SE, Ludwigshafen (DE)

(72) Inventors: Ruediger Funk, Luwigshafen (DE); Thomas Pfeiffer, Ludwigshafen (DE); Matthias Weismantel, Ludwigshafen (DE); Monte Alan Peterson, Freeport, TX (US); Karl Possemiers, Antwerp (BE); Ronny De Kaey, Antwerp (BE)

(73) Assignee: BASF SE, Ludwigshafen (DE)

( * ) Notice: Subject to any disclaimer, the term of this patent is extended or adjusted under 35 U.S.C. 154(b) by 636 days.

(21) Appl. No.: 16/628,689

(22) PCT Filed: Jul. 6, 2018

(86) PCT No.: PCT/EP2018/068326
§ 371 (c)(1),
(2) Date: Jan. 6, 2020

(87) PCT Pub. No.: WO2019/011793
PCT Pub. Date: Jan. 17, 2019

(65) Prior Publication Data
US 2020/0216622 A1    Jul. 9, 2020

(30) Foreign Application Priority Data

Jul. 12, 2017   (EP) ..................... 17180871

(51) Int. Cl.
*C08J 3/12* (2006.01)
*B07B 1/46* (2006.01)
*C08J 3/075* (2006.01)
*C08J 3/24* (2006.01)

(52) U.S. Cl.
CPC ..................... *C08J 3/12* (2013.01); *B07B 1/46* (2013.01); *C08J 3/075* (2013.01); *C08J 3/245* (2013.01); *C08J 2300/12* (2013.01); *C08J 2300/14* (2013.01); *C08J 2333/08* (2013.01)

(58) Field of Classification Search
CPC ..... C08J 3/12; C08J 3/075; C08J 3/245; C08J 2300/12; C08J 2300/14; C08J 2333/08; B07B 1/46; B07B 1/00; B02C 4/02; B02C 4/30; B02C 23/08
See application file for complete search history.

(56) References Cited

U.S. PATENT DOCUMENTS

| | | |
|---|---|---|
| 6,239,230 B1 | 5/2001 | Eckert et al. |
| 6,241,928 B1 | 6/2001 | Hatsuda et al. |
| 2004/0242761 A1 | 12/2004 | Dairoku et al. |
| 2012/0283401 A1* | 11/2012 | Funk ................ C08F 6/008 526/181 |

FOREIGN PATENT DOCUMENTS

| | | |
|---|---|---|
| DE | 3314019 A1 | 1/1984 |
| DE | 35 23 617 A1 | 1/1986 |
| DE | 3713601 A1 | 11/1988 |
| DE | 38 25 366 A1 | 2/1989 |
| DE | 40 20 780 C1 | 8/1991 |
| DE | 19543368 A1 | 5/1997 |
| DE | 19646484 A1 | 5/1997 |
| DE | 19807502 A1 | 9/1999 |
| DE | 19854573 A1 | 5/2000 |
| DE | 19854574 A1 | 5/2000 |
| DE | 102 04 937 A1 | 8/2003 |
| DE | 10204938 A1 | 8/2003 |
| DE | 10331450 A1 | 1/2005 |
| DE | 10331456 A1 | 2/2005 |
| DE | 10334584 A1 | 2/2005 |
| DE | 10355401 A1 | 6/2005 |
| EP | 083022 A2 | 7/1983 |
| EP | 0450922 A2 | 10/1991 |
| EP | 543303 A1 | 5/1993 |
| EP | 0547847 A1 | 6/1993 |
| EP | 559476 A1 | 9/1993 |
| EP | 0632068 A1 | 1/1995 |
| EP | 0640330 A1 | 3/1995 |
| EP | 0937736 A2 | 8/1999 |
| EP | 1199327 A2 | 4/2002 |
| EP | 3279239 A1 | 2/2018 |
| WO | WO-90/15830 A1 | 12/1990 |
| WO | WO-9321237 A1 | 10/1993 |
| WO | WO-2001/038402 A1 | 5/2001 |
| WO | WO-2002/032962 A2 | 4/2002 |
| WO | WO-2002/055469 A1 | 7/2002 |
| WO | WO-2003/031482 A1 | 4/2003 |

(Continued)

OTHER PUBLICATIONS

Buchholz, et al., eds., "Modern Superabsorbent Polymer Technology," Wiley-VCH, NY, NY (1998), pp. 71-103.

(Continued)

*Primary Examiner* — Andrew J. Oyer
(74) *Attorney, Agent, or Firm* — Marshall, Gerstein & Borun LLP

(57) ABSTRACT

The invention relates to a process for producing superabsorbent polymer particles, comprising surface postcrosslinking, classifying the surface postcrosslinked superabsorbent polymer particles, deagglomerating the separated oversize fraction using a roll crusher and recycling the disintegrated oversize fraction before or into the classification of the surface postcrosslinked superabsorbent polymer particles.

21 Claims, No Drawings

(56) References Cited

FOREIGN PATENT DOCUMENTS

| WO | WO-2003/078378 A1 | 9/2003 |
|---|---|---|
| WO | WO-2003104299 A1 | 12/2003 |
| WO | WO-2003104300 A1 | 12/2003 |
| WO | WO-2003104301 A1 | 12/2003 |
| WO | WO-2004/035514 A1 | 4/2004 |
| WO | WO-2008/037673 A1 | 4/2008 |
| WO | WO-2008/040715 A2 | 4/2008 |
| WO | WO-2008/052971 A1 | 5/2008 |
| WO | WO-2015/163512 A1 | 10/2015 |
| WO | WO-2016/159144 A1 | 10/2016 |

OTHER PUBLICATIONS

International Application No. PCT/EP2018/068326, International Search Report and Written Opinion, dated Oct. 8, 2018.
Perry, R. H., et al., *Perry's Chemical Engineers' Handbook*. McGraw-Hill Professional, 1999, p. 12-48.
Graham, et al., "Commercial Processes for the Manufacture of Superabsorbent Polymers", Modern Superabsorbent Polymer Technology, ed. Buchholz, et al., 1998, pp. 69-117.

\* cited by examiner

PROCESS FOR PRODUCING SUPERABSORBENT POLYMER PARTICLES

CROSS-REFERENCE TO RELATED APPLICATIONS

This application is the U.S. National Stage application of International Patent Application No. PCT/EP2018/068326, filed Jul. 6, 2018, which claims the benefit of European Patent Application No. 17180871.0, filed Jul. 12, 2017.

The invention relates to a process for producing superabsorbent polymer particles, comprising surface postcrosslinking, classifying the surface postcrosslinked superabsorbent polymer particles, deagglomerating the separated oversize fraction using a roll crusher and recycling the deagglomerated oversize fraction before or into the classification of the surface postcrosslinked superabsorbent polymer particles.

Superabsorbent polymer particles are used to produce diapers, tampons, sanitary napkins and other hygiene articles, but also as water-retaining agents. The superabsorbent polymer particles are often also referred to as "absorbent resins", "superabsorbents", "water-absorbent polymers", "absorbent polymers", "absorbent gelling materials", "hydrophilic polymers" or "hydrogels".

The production of superabsorbent polymer particles is described in the monograph "Modern Superabsorbent Polymer Technology", F. L. Buchholz and A. T. Graham, Wiley-VCH, 1998, pages 71 to 103.

US 2004/0242761 A1 teaches the deagglomeration of agglomerates that are formed during surface postcrosslinking and WO 2008/037673 A1 discloses a process for separation of such agglomerates.

It was an object of the present invention to provide a process for producing surface postcrosslinked superabsorbent polymer particles with an improved product quality.

The object was achieved by a process for producing superabsorbent polymer particles, comprising polymerization of a monomer solution or suspension, comprising
  a) at least one ethylenically unsaturated monomer which bears acid groups and may be at least partly neutralized,
  b) at least one crosslinker,
  c) at least one initiator,
  d) optionally one or more ethylenically unsaturated monomers copolymerizable with the monomers mentioned under a) and
  e) optionally one or more water-soluble polymers,
drying the resulting polymer gel, grinding, classifying and surface postcrosslinking the resulting polymer particles, wherein the surface postcrosslinked superabsorbent polymer particles are classified into an undersize, midsize and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles.

Roll crushers can consist of single or multiple rolls. The surface of the rolls is smooth, corrugated, or toothed. Roll crushers are described in "Perry's Chemical Engineer's Handbook", 6$^{th}$ Ed., McGraw-Hill Book Group, pages 8-26 and 8-27.

In a preferred embodiment of the present invention double toothed roll crushers are used. Preferably, the teeth of the double toothed roll crusher have rounded edges so that the roll crusher deagglomerates the agglomerates mainly by compression.

In a more preferred embodiment of the present invention the rolls of the roll crusher have a smooth surface. The surface of the rolls of the roll crusher has a roughness $R_z$ of preferably less than 25 µm, more preferably of less than 15 µm, most preferably of less than 5 µm. The roughness $R_z$ is the greatest height of the profile and is described in DIN EN ISO 4287.

The gap width of the roll crusher is preferably from 0.8 to 10 mm, more preferably from 0.9 to 5 mm, most preferably from 1.0 to 2 mm, wherein the gap width of the roll crusher is the smallest distance between the two surfaces that form the gap of the roll crusher.

The sieve for separating the oversize fraction and the midsize fraction has a mesh size from preferably 600 to 1.200 µm, more preferably 700 to 1,100 µm, most preferably 800 to 1,000 µm.

The sieve for separating the undersize fraction and the midsize fraction has a mesh size from preferably 100 to 300 µm, more preferably 120 to 250 µm, most preferably 150 to 200 µm.

In a preferred embodiment of the present invention the gap width of the roll crusher is larger than the mesh size of the sieve for separating the oversize fraction and the midsize fraction.

The gap width of the roll crusher is preferably from 50 to 800 µm, more preferably from 100 to 600 µm, most preferably from 150 to 400 µm, larger than the mesh size of the sieve for separating the oversize fraction and the midsize fraction.

In a preferred embodiment of the present invention the sieve for separating the oversize fraction and the midsize fraction has a mesh size from 600 to 1.200 µm and the gap width of the roll crusher is from 50 to 800 µm larger than the mesh size of the sieve for separating the oversize fraction and the midsize fraction, preferably the sieve for separating the oversize fraction and the midsize fraction has a mesh size from 600 to 1.200 µm and the gap width of the roll crusher is from 100 to 600 µm larger than the mesh size of the sieve for separating the oversize fraction and the midsize fraction, more preferably the sieve for separating the oversize fraction and the midsize fraction has a mesh size from 600 to 1.200 µm and the gap width of the roll crusher is from 150 to 400 µm larger than the mesh size of the sieve for separating the oversize fraction and the midsize fraction.

In another preferred embodiment of the present invention the sieve for separating the oversize fraction and the midsize fraction has a mesh size from 700 to 1.100 µm and the gap width of the roll crusher is from 50 to 800 µm larger than the mesh size of the sieve for separating the oversize fraction and the midsize fraction, preferably the sieve for separating the oversize fraction and the midsize fraction has a mesh size from 700 to 1.100 µm and the gap width of the roll crusher is from 100 to 600 µm larger than the mesh size of the sieve for separating the oversize fraction and the midsize fraction, more preferably the sieve for separating the oversize fraction and the midsize fraction has a mesh size from 700 to 1.100 µm and the gap width of the roll crusher is from 150 to 400 µm larger than the mesh size of the sieve for separating the oversize fraction and the midsize fraction.

In another preferred embodiment of the present invention the sieve for separating the oversize fraction and the midsize fraction has a mesh size from 800 to 1.000 µm and the gap width of the roll crusher is from 50 to 800 µm larger than the mesh size of the sieve for separating the oversize fraction and the midsize fraction, preferably the sieve for separating the oversize fraction and the midsize fraction has a mesh size from 800 to 1.000 µm and the gap width of the roll crusher is from 100 to 600 µm larger than the mesh size of the sieve for separating the oversize fraction and the midsize fraction, more preferably the sieve for separating the oversize fraction and the midsize fraction has a mesh size from 800 to 1.000 µm and the gap width of the roll crusher is from 150 to 400 µm larger than the mesh size of the sieve for separating the oversize fraction and the midsize fraction.

In a preferred embodiment of the present invention the undersize fraction is recycled into the polymerization and/or the surface postcrosslinked superabsorbent polymer particles are classified using a tumbling screen machine.

The present invention is based on the finding that the agglomerates that are formed during the surface postcrosslinking of water-absorbent polymer particles can be easily deagglomerated without negative impact on the product quality by using a roll crusher. In a roll crusher the agglomerates are crushed and are not milled or cut. The surface postcrosslinking results in polymer particles having an outer shell having a high crosslinking density. Milling destroys that outer shell by attrition and cutting is not limited to deagglomeration of agglomerates. During crushing in a roll crusher there is a moderate mechanical stress on the agglomerates so that the agglomerates can break at the weakest part of the agglomerates without breaking of the primary particles that forms the agglomerates.

The mechanical stress during crushing can be further decreased by increasing the gap width of the roll crusher and increasing the circulation load. A too high gap width results in a too high circulation load and overloading of the classification. The circulation load is the rate of recycled oversize fraction based on the production rate. The circulation load may be in the range from 0.02 to 0.4.

The present invention further provides an apparatus for sizing of surface postcrosslinked superabsorbent polymer particles, comprising a tumbling sieve machine for classifying particles into an undersize, midsize, and oversize fraction, a roll crusher for deagglomerating the oversize fraction, and a line for recycling the deagglomerated superabsorbent polymer particles before or into the tumbling sieve machine.

In a preferred embodiment of the present invention double toothed roll crushers are used. Preferably, the teeth of the double toothed roll crusher have rounded edges.

The surface of the rolls of the roll crusher has a roughness $R_z$ of preferably less than 25 µm, more preferably of less than 15 µm, most preferably of less than 5 µm. The roughness $R_z$ is the greatest height of the profile and is described in DIN EN ISO 4287.

The gap width of the roll crusher is preferably from 0.8 to 10 mm, more preferably from 0.9 to 5 mm, most preferably from 1.0 to 2 mm, wherein the gap width of the roll crusher is the smallest distance between the two surfaces that form the gap of the roll crusher.

The sieve for separating the oversize fraction and the midsize fraction has a mesh size from preferably 600 to 1.200 µm, more preferably 700 to 1,100 µm, most preferably 800 to 1,000 µm.

The sieve for separating the undersize fraction and the midsize fraction has a mesh size from preferably 100 to 300 µm, more preferably 120 to 250 µm, most preferably 150 to 200 µm.

In a preferred embodiment of the present invention the gap width of the roll crusher is larger than the mesh size of the sieve for separating the oversize fraction and the midsize fraction.

The gap width of the roll crusher is preferably from 50 to 800 µm, more preferably from 100 to 600 µm, most preferably from 150 to 400 µm, larger than the mesh size of the sieve for separating the oversize fraction and the midsize fraction.

The production of the superabsorbent polymer particles is described in detail hereinafter:

The superabsorbent polymer particles are produced by polymerizing a monomer solution or suspension, and are typically water-insoluble.

The monomers a) are preferably water-soluble, i.e. the solubility in water at 23° C. is typically at least 1 g/100 g of water, preferably at least 5 g/100 g of water, more preferably at least 25 g/100 g of water and most preferably at least 35 g/100 g of water.

Suitable monomers a) are, for example, ethylenically unsaturated carboxylic acids, such as acrylic acid, methacrylic acid and itaconic acid. Particularly preferred monomers are acrylic acid and methacrylic acid. Very particular preference is given to acrylic acid.

Further suitable monomers a) are, for example, ethylenically unsaturated sulfonic acids, such as styrenesulfonic acid and 2-acrylamido-2-methylpropanesulfonic acid (AMPS).

Impurities can have a considerable influence on the polymerization. The raw materials used should therefore have a high and constant purity. It is therefore often advantageous to specially purify the monomers a). Suitable purification processes are described, for example, in WO 2002/055469 A1, WO 2003/078378 A1 and WO 2004/035514 A1. A suitable monomer a) is, for example, acrylic acid purified according to WO 2004/035514 A1 and comprising 99.8460% by weight of acrylic acid, 0.0950% by weight of acetic acid, 0.0332% by weight of water, 0.0203% by weight of propionic acid, 0.0001% by weight of furfurals, 0.0001% by weight of maleic anhydride, 0.0003% by weight of diacrylic acid and 0.0050% by weight of hydroquinone monomethyl ether.

The proportion of acrylic acid and/or salts thereof in the total amount of monomers a) is preferably at least 50 mol %, more preferably at least 90 mol %, most preferably at least 95 mol %.

The monomers a) typically comprise polymerization inhibitors, preferably hydroquinone monoethers, as storage stabilizers.

The monomer solution comprises preferably up to 250 ppm by weight, preferably at most 130 ppm by weight, more preferably at most 70 ppm by weight, and preferably at least 10 ppm by weight, more preferably at least 30 ppm by weight and especially around 50 ppm by weight, of hydroquinone monoether, based in each case on the unneutralized monomer a). For example, the monomer solution can be prepared by using an ethylenically unsaturated monomer bearing acid groups with an appropriate content of hydroquinone monoether.

Preferred hydroquinone monoethers are hydroquinone monomethyl ether (MEHQ) and/or alpha-tocopherol (vitamin E).

Suitable crosslinkers b) are compounds having at least two groups suitable for crosslinking. Such groups are, for example, ethylenically unsaturated groups which can be polymerized free-radically into the polymer chain, and functional groups which can form covalent bonds with the acid groups of the monomer a). In addition, polyvalent metal salts which can form coordinate bonds with at least two acid groups of the monomer a) are also suitable as crosslinkers b).

Crosslinkers b) are preferably compounds having at least two polymerizable groups which can be polymerized free-radically into the polymer network. Suitable crosslinkers b)

are, for example, ethylene glycol dimethacrylate, diethylene glycol diacrylate, polyethylene glycol diacrylate, allyl methacrylate, trimethylolpropane triacrylate, triallylamine, tetraallylammonium chloride, tetraallyloxyethane, as described in EP 0 530 438 A1, di- and triacrylates, as described in EP 0 547 847 A1, EP 0 559 476 A1, EP 0 632 068 A1, WO 93/21237 A1, WO 2003/104299 A1, WO 2003/104300 A1, WO 2003/104301 A1 and DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/032962 A2.

Preferred crosslinkers b) are pentaerythrityl triallyl ether, tetraallyloxyethane, methylenebismethacrylamide, 15-tuply ethoxylated trimethylolpropane triacrylate, polyethylene glycol diacrylate, trimethylolpropane triacrylate and triallylamine.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol, especially the triacrylate of 3-tuply ethoxylated glycerol.

The amount of crosslinker b) is preferably 0.05 to 1.5% by weight, more preferably 0.1 to 1% by weight and most preferably 0.2 to 0.6% by weight, based in each case on monomer a). With rising crosslinker content, the centrifuge retention capacity (CRC) falls and the absorption under a pressure of 21.0 g/cm$^2$ passes through a maximum.

The initiators c) used may be all compounds which generate free radicals under the polymerization conditions, for example thermal initiators, redox initiators, photoinitiators. Suitable redox initiators are sodium peroxodisulfate/ascorbic acid, hydrogen peroxide/ascorbic acid, sodium peroxodisulfate/sodium bisulfite and hydrogen peroxide/sodium bisulfite. Preference is given to using mixtures of thermal initiators and redox initiators, such as sodium peroxodisulfate/hydrogen peroxide/ascorbic acid. However, the reducing component used is preferably disodium 2-hydroxy-2-sulfonatoacetate or a mixture of disodium 2-hydroxy-2-sulfinatoacetate, disodium 2-hydroxy-2-sulfonatoacetate and sodium bisulfite. Such mixtures are obtainable as Brüggolite® FF6 and Brüggolite® FF7 (Brüggemann Chemicals; Heilbronn; Germany).

Ethylenically unsaturated monomers d) copolymerizable with the ethylenically unsaturated monomers a) bearing acid groups are, for example, acrylamide, methacrylamide, hydroxyethyl acrylate, hydroxyethyl methacrylate, dimethylaminoethyl methacrylate, dimethylaminoethyl acrylate, dimethylaminopropyl acrylate, diethylaminopropyl acrylate, dimethylaminoethyl methacrylate, diethylaminoethyl methacrylate.

The water-soluble polymers e) used may be polyvinyl alcohol, polyvinylpyrrolidone, starch, starch derivatives, modified cellulose, such as methylcellulose or hydroxyethylcellulose, gelatin, polyglycols or polyacrylic acids, preferably starch, starch derivatives and modified cellulose.

Typically, an aqueous monomer solution is used. The water content of the monomer solution is preferably from 40 to 75% by weight, more preferably from 45 to 70% by weight and most preferably from 50 to 65% by weight. It is also possible to use monomer suspensions, i.e. monomer solutions with excess monomer a), for example sodium acrylate. With rising water content, the energy requirement in the subsequent drying rises, and, with falling water content, the heat of polymerization can only be removed inadequately.

For optimal action, the preferred polymerization inhibitors require dissolved oxygen. The monomer solution can therefore be freed of dissolved oxygen before the polymerization by inertization, i.e. flowing an inert gas through, preferably nitrogen or carbon dioxide. The oxygen content of the monomer solution is preferably lowered before the polymerization to less than 1 ppm by weight, more preferably to less than 0.5 ppm by weight, most preferably to less than 0.1 ppm by weight.

For better control of the polymerization reaction, it is optionally possible to add all known chelating agents to the monomer solution or suspension or to the raw materials thereof. Suitable chelating agents are, for example, phosphoric acid, diphosphoric acid, triphosphoric acid, polyphosphoric acid, citric acid, tartaric acid, or salts thereof.

Further suitable examples are iminodiacetic acid, hydroxyethyliminodiacetic acid, nitrilotriacetic acid, nitrilotripropionic acid, ethylenediaminetetraacetic acid, diethylenetriaminepentaacetic acid, triethylenetetraaminehexaacetic acid, N,N-bis(2-hydroxyethyl)glycine and trans-1,2-diaminocyclohexanetetraacetic acid, and salts thereof. The amount used is typically 1 to 30 000 ppm based on the monomers a), preferably 10 to 1000 ppm, preferentially 20 to 600 ppm, more preferably 50 to 400 ppm, most preferably 100 to 300 ppm.

The monomer solution or suspension is polymerized. Suitable reactors are, for example, kneading reactors or belt reactors. In the kneader, the polymer gel formed in the polymerization of an aqueous monomer solution or suspension is comminuted continuously by, for example, contrarotatory stirrer shafts, as described in WO 2001/038402 A1. Polymerization on the belt is described, for example, in DE 38 25 366 A1 and U.S. Pat. No. 6,241,928. Polymerization in a belt reactor forms a polymer gel which has to be comminuted in a further process step, for example in an extruder or kneader.

To improve the drying properties, the comminuted polymer gel obtained by means of a kneader can additionally be extruded.

However, it is also possible to dropletize an aqueous monomer solution and to polymerize the droplets obtained in a heated carrier gas stream. It is possible here to combine the process steps of polymerization and drying, as described in WO 2008/040715 A2 and WO 2008/052971 A1.

The acid groups of the resulting polymer gels have typically been partially neutralized. Neutralization is preferably carried out at the monomer stage. This is typically accomplished by mixing in the neutralizing agent as an aqueous solution or preferably also as a solid. The degree of neutralization is preferably from 50 to 90 mol %, more preferably from 60 to 85 mol % and most preferably from 65 to 80 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

However, it is also possible to carry out neutralization after the polymerization, at the stage of the polymer gel formed in the polymerization. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the polymer gel stage. When the polymer gel is neutralized at least partly after the polymerization, the polymer gel is preferably comminuted mechanically, for example by means of an extruder, in which case the neutralizing agent can be sprayed, sprinkled or poured on and then carefully mixed in. To this end, the gel mass obtained can be repeatedly extruded for homogenization.

The resulting polymer gel is dried. The driers are not subject to any restriction. However, the drying of the polymer gel is preferably performed with a belt drier until the residual moisture content is preferably 0.5 to 10% by weight, more preferably 1 to 7% by weight and most preferably 2 to 5% by weight, the residual moisture content being determined by EDANA recommended test method No. WSP 230.2-05 "Mass Loss Upon Heating". In the case of too high a residual moisture content, the dried polymer gel has too low a glass transition temperature $T_g$ and can be processed further only with difficulty. In the case of too low a residual moisture content, the dried polymer gel is too brittle and, in the subsequent grinding steps, undesirably large amounts of polymer particles with an excessively low particle size are obtained ("fines"). The solids content of the gel before the drying is preferably from 25 to 90% by weight, more preferably from 35 to 70% by weight and most preferably from 40 to 60% by weight. However, a fluidized bed drier or a paddle drier may optionally also be used for drying purposes.

Subsequently, the dried polymer gel is ground and classified. The apparatus used for grinding may typically be single- or multistage roll mills, preferably two- or three-stage roll mills, pin mills, hammer mills or vibratory mills.

The mean particle size of the polymer particles removed as the product fraction is preferably at least 200 µm, more preferably from 250 to 600 µm and very particularly from 300 to 500 µm. The mean particle size of the product fraction may be determined by means of EDANA recommended test method No. WSP 220.2-05 "Particle Size Distribution", where the proportions by mass of the screen fractions are plotted in cumulated form and the mean particle size is determined graphically. The mean particle size here is the value of the mesh size which gives rise to a cumulative 50% by weight.

The proportion of particles with a particle size of at least 150 µm is preferably at least 90% by weight, more preferably at least 95% by weight, most preferably at least 98% by weight.

Polymer particles with too small a particle size lower the saline flow conductivity (SFC). The proportion of excessively small polymer particles ("fines") should therefore be low.

Excessively small polymer particles are therefore typically removed and recycled into the process. This is preferably done before, during or immediately after the polymerization, i.e. before the drying of the polymer gel. The excessively small polymer particles can be moistened with water and/or aqueous surfactant before or during the recycling.

It is also possible to remove excessively small polymer particles in later process steps, for example after the surface postcrosslinking or another coating step. In this case, the excessively small polymer particles recycled are surface postcrosslinked or coated in another way, for example with fumed silica.

When a kneading reactor is used for polymerization, the excessively small polymer particles are preferably added during the last third of the polymerization.

When the excessively small polymer particles are added at a very early stage, for example actually to the monomer solution, this lowers the centrifuge retention capacity (CRC) of the resulting superabsorbent polymer particles. However, this can be compensated for, for example, by adjusting the amount of crosslinker b) used.

When the excessively small polymer particles are added at a very late stage, for example not until an apparatus connected downstream of the polymerization reactor, for example an extruder, the excessively small polymer particles can be incorporated into the resulting polymer gel only with difficulty. Insufficiently incorporated, excessively small polymer particles are, however, detached again from the dried polymer gel during the grinding, are therefore removed again in the course of classification and increase the amount of excessively small polymer particles to be recycled.

The proportion of particles having a particle size of at most 850 µm is preferably at least 90% by weight, more preferably at least 95% by weight, most preferably at least 98% by weight.

The proportion of particles having a particle size of at most 600 µm is preferably at least 90% by weight, more preferably at least 95% by weight, most preferably at least 98% by weight.

Polymer particles of excessively large particle size lower the free swell rate. The proportion of excessively large polymer particles should therefore likewise be small.

Excessively large polymer particles are therefore typically removed and recycled into the grinding of the dried polymer gel.

To improve the properties, the polymer particles are subsequently surface postcrosslinked. Suitable surface postcrosslinkers are compounds which comprise groups which can form covalent bonds with at least two acid groups of the polymer particles. Suitable compounds are, for example, polyfunctional amines, polyfunctional amido amines, polyfunctional epoxides, as described in EP 0 083 022 A2, EP 0 543 303 A1 and EP 0 937 736 A2, di- or polyfunctional alcohols, as described in DE 33 14 019 A1, DE 35 23 617 A1 and EP 0 450 922 A2, or β-hydroxyalkylamides, as described in DE 102 04 938 A1 and U.S. Pat. No. 6,239,230.

Additionally described as suitable surface postcrosslinkers are cyclic carbonates in DE 40 20 780 C1, 2-oxazolidinone and derivatives thereof, such as 2-hydroxyethyl-2-oxazolidinone, in DE 198 07 502 A1, bis- and poly-2-oxazolidinones in DE 198 07 992 C1, 2-oxotetrahydro-1,3-oxazine and derivatives thereof in DE 198 54 573 A1, N-acyl-2-oxazolidinones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and derivatives thereof in WO 2003/031482 A1.

Preferred surface postcrosslinkers are ethylene carbonate, ethylene glycol diglycidyl ether, reaction products of polyamides with epichlorohydrin and mixtures of propylene glycol and 1,4-butanediol.

Very particularly preferred surface postcrosslinkers are 2-hydroxyethyloxazolidin-2-one, oxazolidin-2-one and 1,3-propanediol.

In addition, it is also possible to use surface postcrosslinkers which comprise additional polymerizable ethylenically unsaturated groups, as described in DE 37 13 601 A1.

The amount of surface postcrosslinker is preferably 0.001 to 2% by weight, more preferably 0.02 to 1% by weight and most preferably 0.05 to 0.2% by weight, based in each case on the polymer particles.

In a preferred embodiment of the present invention, polyvalent cations are applied to the particle surface in addition to the surface postcrosslinkers before, during or after the surface postcrosslinking.

The polyvalent cations usable in the process according to the invention are, for example, divalent cations such as the cations of zinc, magnesium, calcium, iron and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate and aluminum lactate are preferred. Apart from metal salts, it is also possible to use polyamines as polyvalent cations.

The amount of polyvalent cation used is, for example, 0.001 to 1.5% by weight, preferably 0.005 to 1% by weight and more preferably 0.02 to 0.8% by weight, based in each case on the polymer particles.

The surface postcrosslinking is typically performed in such a way that a solution of the surface postcrosslinker is sprayed onto the dried polymer particles. After the spray application, the polymer particles coated with surface postcrosslinker are dried thermally, and the surface postcrosslinking reaction can take place either before or during the drying.

The spray application of a solution of the surface postcrosslinker is preferably performed in mixers with moving mixing tools, such as screw mixers, disk mixers and paddle mixers. Particular preference is given to horizontal mixers such as paddle mixers, very particular preference to vertical mixers. The distinction between horizontal mixers and vertical mixers is made by the position of the mixing shaft, i.e. horizontal mixers have a horizontally mounted mixing shaft and vertical mixers a vertically mounted mixing shaft. Suitable mixers are, for example, horizontal Pflugschar® plowshare mixers (Gebr. Lodige Maschinenbau GmbH; Paderborn; Germany), Vrieco-Nauta continuous mixers (Hosokawa Micron BV; Doetinchem; the Netherlands), Processall Mixmill mixers (Processall Incorporated; Cincinnati; USA) and Schugi Flexomix® (Hosokawa Micron BV; Doetinchem; the Netherlands). However, it is also possible to spray on the surface postcrosslinker solution in a fluidized bed.

The surface postcrosslinkers are typically used in the form of an aqueous solution. The penetration depth of the surface postcrosslinker into the polymer particles can be adjusted via the content of nonaqueous solvent and total amount of solvent.

When exclusively water is used as the solvent, a surfactant is advantageously added. This improves the wetting behavior and reduces the tendency to form lumps. However, preference is given to using solvent mixtures, for example isopropanol/water, 1,3-propanediol/water and propylene glycol/water, where the mixing ratio in terms of mass is preferably from 20:80 to 40:60.

The surface postcrosslinking is preferably performed in contact driers, more preferably paddle driers, most preferably disk driers. Suitable driers are, for example, Hosokawa Bepex® Horizontal Paddle Dryer (Hosokawa Micron GmbH; Leingarten; Germany), Hosokawa Bepex® Disc Dryer (Hosokawa Micron GmbH; Leingarten; Germany) and Nara Paddle Dryer (NARA Machinery Europe; Frechen; Germany). Moreover, fluidized bed driers may also be used.

The surface postcrosslinking can be effected in the mixer itself, by heating the jacket or blowing in warm air. Equally suitable is a downstream drier, for example a shelf drier, a rotary tube oven or a heatable screw. It is particularly advantageous to effect mixing and drying in a fluidized bed drier.

Preferred surface postcrosslinking temperatures are in the range of 100 to 250° C., preferably 110 to 220° C., more preferably 120 to 210° C. and most preferably 130 to 200° C. The preferred residence time at this temperature in the reaction mixer or drier is preferably at least 10 minutes, more preferably at least 20 minutes, most preferably at least 30 minutes, and typically at most 60 minutes.

Subsequently, the surface postcrosslinked polymer particles are classified again, excessively small and/or excessively large polymer particles being removed and recycled into the process.

To further improve the properties, the surface postcrosslinked polymer particles can be coated or remoisturized.

The remoisturizing is preferably performed at 30 to 80° C., more preferably at 35 to 70° C., most preferably at 40 to 60° C. At excessively low temperatures, the superabsorbent polymer particles tend to form lumps, and, at higher temperatures, water already evaporates to a noticeable degree. The amount of water used for remoisturizing is preferably from 1 to 10% by weight, more preferably from 2 to 8% by weight and most preferably from 3 to 5% by weight. The remoisturizing increases the mechanical stability of the polymer particles and reduces their tendency to static charging.

Suitable coatings for improving the free swell rate and the saline flow conductivity (SFC) are, for example, inorganic inert substances, such as water-insoluble metal salts, organic polymers, cationic polymers and di- or polyvalent metal cations. Suitable coatings for dust binding are, for example, polyols. Suitable coatings for counteracting the undesired caking tendency of the polymer particles are, for example, fumed silica, such as Aerosil® 200, and surfactants, such as Span® 20.

The superabsorbent polymer particles produced by the process according to the invention have a centrifuge retention capacity (CRC) of typically at least 15 g/g, preferably at least 20 g/g, more preferably at least 22 g/g, especially preferably at least 24 g/g and most preferably at least 26 g/g. The centrifuge retention capacity (CRC) of the superabsorbent polymer particles is typically less than 60 g/g. The centrifuge retention capacity (CRC) is determined by EDANA recommended test method No. NWSP 241.0.R2 (15) "Determination of the Fluid Retention Capacity in Saline Solution by Gravimetric Measurement Following Centrifugation".

The superabsorbent polymer particles produced by the process according to the invention have an absorption under high load (AUHL) of typically at least 15 g/g, preferably at least 20 g/g, more preferably at least 22 g/g, especially preferably at least 24 g/g and most preferably at least 26 g/g. The absorption under high load (AUHL) of the superabsorbent polymer particles is typically less than 35 g/g. The absorption under high load (AUHL) is determined by EDANA recommended test method No. WSP NWSP 242.0.R2 "Gravimetric Determination of Absorption Against Pressure" and a pressure of 49.2 g/cm$^2$.

Methods:

The measurements should, unless stated otherwise, be carried out at an ambient temperature of 23±2° C. and a relative atmospheric humidity of 50±10%. The water-absorbent polymers are mixed thoroughly before the measurement.

Centrifuge Retention Capacity (CRC)

The centrifuge retention capacity of the water-absorbent polymer particles is determined by the EDANA recommended test method No. NWSP 241.0.R2 (15) "Determination of the Fluid Retention Capacity in Saline Solution by Gravimetric Measurement Following Centrifugation", wherein for higher values of the centrifuge retention capacity lager tea bags have to be used.

Absorbency Under High Load (AUHL)

The absorbency under high load of the water-absorbent polymer particles is determined by the EDANA recommended test method No. WSP NWSP 242.0.R2 "Gravimetric Determination of Absorption Against Pressure" and a pressure of 49.2 g/cm$^2$.

Saline Flow Conductivity (SFC)

The saline flow conductivity is, as described in EP 0 640 330 A1, determined as the gel layer permeability of a swollen gel layer of water-absorbent polymer particles, although the apparatus described on page 19 and in FIG. 8 in the aforementioned patent application was modified to the effect that the glass frit (40) is no longer used, the plunger (39) consists of the same polymer material as the cylinder (37) and now comprises 21 bores having a diameter of 9.65 mm each distributed uniformly over the entire contact surface. The procedure and the evaluation of the measurement remains unchanged from EP 0 640 330 A1. The flow rate is recorded automatically.

The saline flow conductivity (SFC) is calculated as follows:

$$SFC[cm^3 s/g] = (Fg(t=0) \times L0)/(d \times A \times WP),$$

where Fg(t=0) is the flow rate of NaCl solution in g/s, which is obtained by means of a linear regression analysis of the Fg(t) data of the flow determinations by extrapolation to t=0, L0 is the thickness of the gel layer in cm, d is the density of the NaCl solution in g/cm$^3$, A is the surface area of the gel layer in cm$^2$ and WP is the hydrostatic pressure over the gel layer in dyn/cm$^2$.

EXAMPLES

Example 1

By continuously mixing deionized water, 50% by weight sodium hydroxide solution and acrylic acid, an acrylic acid/sodium acrylate solution was prepared, such that the degree of neutralization corresponds to 71 mol %. The solids content of the monomer solution was 41.5% by weight.

3-tuply ethoxylated glycerol triacrylate was used as crosslinker. The amount of crosslinker was 1.06 kg per t of monomer solution.

The free-radical polymerization was initiated by adding 1.3 kg of a 0.25% by weight aqueous hydrogen peroxide solution, 1.54 kg of a 27% by weight aqueous sodium peroxodisulfate solution, and 1.4 kg of a 1% by weight aqueous ascorbic acid solution, each based per t of monomer solution.

The throughput of the monomer solution was 18 t/h. The monomer solution had a temperature of 30° C. at the feed.

The individual components were metered in the following amounts continuously into a continuous kneader reactor with a capacity of 6.3 m$^3$ (LIST AG, Arisdorf, Switzerland):

| | |
|---|---|
| 18.0 t/h | of monomer solution |
| 19.08 kg/h | of 3-tuply ethoxylated glycerol triacrylate |
| 51.12 kg/h | of hydrogen peroxide solution/sodium peroxodisulfate solution |
| 25.2 kg/h | of ascorbic acid solution |

Between the addition point for the crosslinker and the addition sites for the initiators, the monomer solution was inertized with nitrogen.

After approx. 50% of the residence time, a metered addition of fines (1000 kg/h), which were obtained from the production process by grinding and screening, to the reactor additionally took place. The residence time of the reaction mixture in the reactor was 15 minutes.

The resulting polymer gel was placed onto a belt dryer. On the belt dryer, an air/gas mixture flowed continuously around the polymer gel and dried it.

The dried polymer gel was ground and screened off to a particle size fraction of 150 to 850 μm.

The resulting base polymer exhibited a centrifuge retention capacity (CRC) of 38.7 g/g, an absorbency under high load (AUL0.7 psi) of 7.3 g/g and a PSD of

| | |
|---|---|
| >850 μm | 2.5 wt. % |
| 300-850 μm | 82.6 wt. % |
| 150-300 μm | 14.1 wt. % |
| <150 μm | 0.8 wt. %. |

The resulting base polymer was surface postcrosslinked:

In a Schugi Flexomix® (Hosokawa Micron B.V., Doetinchem, the Netherlands), the base polymer was coated with a surface postcrosslinker solution and then dried in a NARA® paddle dryer (GMF Gouda, Waddinxveen, the Netherlands) at 185° C. for 45 minutes. The paddle dryer was heated with steam having a pressure of 24 bar (220° C.).

The following amounts were metered into the Schugi Flexomix®:

| | |
|---|---|
| 7.5 t/h | of base polymer |
| 282.75 kg/h | of surface postcrosslinker solution |

The surface postcrosslinker solution comprised of 1.59% by weight of 2-hydroxyethyl-2 oxazolidone, 1.59% by weight of propandiole-1.3, 13.25% by weight of propandiole-1.2, 0.08% by weight of Sorbitanmonolaurat (Span® 20), 11.13% by weight of aluminum trilactate, 51.95% by weight of deionized water, and 20.41% by weight of isopropanol.

After being dried, the surface postcrosslinked base polymer was cooled to approx. 60° C. in a NARA® paddle cooler (GMF Gouda, Waddinxveen, the Netherlands).

After the cooling, the superabsorbent polymer particles were again screened off to from 150 to 850 μm (SXL polymer).

The SXL polymer was analysed and exhibited a centrifuge retention capacity (CRC) of 30.1 g/g, an absorbency under high load (AUHL) of 23.4 g/g, and a saline flow conductivity (SFC) of 52×10$^{-7}$ cm$^3$ s/g.

The oversize fraction (SXL overs) was deagglomerated using a roll crusher having a corrugated surface and a gap width of 0.85 mm (deagglomerated SXL polymer). The SXL polymer and the deagglomerated SXL polymer were combined (SXL product).

The deagglomerated SXL polymer was screened off to a particle size fraction of 150 to 850 μm and analysed. The results are shown in table 1.

Example 2

Example 1 was repeated. The SXL overs were deagglomerated using a roll crusher having a corrugated surface and a gap width of 1.00 mm. The deagglomerated SXL polymer was screened off to a particle size fraction of 150 to 850 μm and analysed. The results are shown in table 1.

Example 3

Example 1 was repeated. The SXL overs were deagglomerated using a roll crusher having a corrugated surface and a gap width of 1.20 mm. The deagglomerated SXL polymer was screened off to a particle size fraction of 150 to 850 μm and analysed. The results are shown in table 1.

Example 4

(Comparative Example)

Example 1 was repeated. The SXL overs were deagglomerated using a rotor mill having a rotor-ring sieve system having round-shaped holes of 10 mm as grinding space bound. The deagglomerated SXL polymer was screened off to a particle size fraction of 150 to 850 μm and analysed. The results are shown in table 1.

Example 5

(Comparative Example)

Example 1 was repeated. The SXL overs were deagglomerated using a rotor mill having a rotor-ring sieve system having round-shaped holes of 6 mm as grinding space bound. The deagglomerated SXL polymer was screened off to a particle size fraction of 150 to 850 μm and analysed. The results are shown in table 1.

TABLE 1

Properties of the deagglomerated SXL overs

| Example | CRC [g/g] | AUL0.7 psi [g/g] | SFC [$10^{-7}$ cm$^3$s/g] |
|---|---|---|---|
| 1 | 28.8 | 22.8 | 45 |
| 2 | 28.7 | 22.0 | 50 |
| 3 | 29.1 | 22.6 | 53 |
| 4*) | 29.9 | 20.3 | 22 |
| 5*) | 30.9 | 19.5 | 10 |

*)comparative example

The invention claimed is:

1. A process for producing superabsorbent polymer particles, comprising polymerization of a monomer solution or suspension, comprising
    a) at least one ethylenically unsaturated monomer which bears an acid group and may be at least partly neutralized,
    b) at least one crosslinker,
    c) at least one initiator,
    d) optionally one or more ethylenically unsaturated monomer copolymerizable with the monomer mentioned under a) and
    e) optionally one or more water-soluble polymer,
    drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
    wherein the roll crusher is a double toothed roll crusher.

2. The process according to claim 1, wherein a surface of the roll crusher has a roughness $R_z$ of less than 25 μm.

3. The process according to claim 1, wherein the roll crusher has a gap width from 1 to 10 mm, wherein the gap width of the roll crusher is the smallest distance between the two surfaces that form the gap of the roll crusher.

4. The process according to claim 1, wherein a sieve for separating the oversize fraction and the midsize fraction has a mesh size from 600 to 1,200 μm.

5. The process according to claim 1, wherein a sieve for separating the undersize fraction and the midsize fraction has a mesh size from 100 to 300 μm.

6. The process according to claim 1, wherein a gap width of the roll crusher is from 50 to 800 μm larger than the mesh size of the sieve for separating the oversize fraction and the midsize fraction, wherein the gap width of the roll crusher is the smallest distance between the two surfaces that form the gap of the roll crusher.

7. The process according to claim 1, wherein the superabsorbent polymer particles of the undersize fraction are recycled into the polymerization.

8. The process according to claim 1, wherein the surface postcrosslinked superabsorbent polymer particles are classified using a tumbling screen machine.

9. The process according to claim 1, wherein the superabsorbent polymer particles have a centrifuge retention capacity of at least 15 g/g.

10. An apparatus for sizing of surface postcrosslinked superabsorbent polymer particles, comprising a tumbling sieve machine for classifying particles into an undersize, midsize, and oversize fraction, a roll crusher for deagglomerating the oversize fraction, and a line for recycling the deagglomerated superabsorbent polymer particles before or into the tumbling sieve machine.

11. The apparatus of claim 10, wherein the roll crusher is a double toothed roll crusher.

12. The apparatus of claim 10, wherein a surface of the roll crusher has a roughness $R_z$ of less than 25 μm.

13. The apparatus of claim 10, wherein the roll crusher has a gap width from 1 to 10 mm, wherein the gap width of the roll crusher is the smallest distance between the two surfaces that form the gap of the roll crusher.

14. The apparatus of claim 10, wherein a sieve for separating the oversize fraction and the midsize fraction has a mesh size from 600 to 1,200 μm.

15. The apparatus of claim 10, wherein a sieve for separating the undersize fraction and the midsize fraction has a mesh size from 100 to 300 μm.

16. The apparatus of claim 10, wherein a gap width of the roll crusher is from 50 to 800 μm larger than the mesh size of the sieve for separating the oversize fraction and the midsize fraction, wherein the gap width of the roll crusher is the smallest distance between the two surfaces that form the gap of the roll crusher.

17. A process for producing superabsorbent polymer particles, comprising polymerization of a monomer solution or suspension, comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a) and
   e) optionally one or more water-soluble polymer,
      drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
      wherein a surface of the roll crusher has a roughness $R_z$ of less than 25 µm.

18. A process for producing superabsorbent polymer particles, comprising polymerization of a monomer solution or suspension, comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a) and
   e) optionally one or more water-soluble polymer,
      drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
      wherein a sieve for separating the oversize fraction and the midsize fraction has a mesh size from 600 to 1,200 µm.

19. A process for producing superabsorbent polymer particles, comprising polymerization of a monomer solution or suspension, comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a) and
   e) optionally one or more water-soluble polymer,
      drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
      wherein a sieve for separating the undersize fraction and the midsize fraction has a mesh size from 100 to 300 µm.

20. A process for producing superabsorbent polymer particles, comprising polymerization of a monomer solution or suspension, comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a) and
   e) optionally one or more water-soluble polymer,
      drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
      wherein a gap width of the roll crusher is from 50 to 800 µm larger than the mesh size of the sieve for separating the oversize fraction and the midsize fraction, wherein the gap width of the roll crusher is the smallest distance between the two surfaces that form the gap of the roll crusher.

21. A process for producing superabsorbent polymer particles, comprising polymerization of a monomer solution or suspension, comprising
   a) at least one ethylenically unsaturated monomer which bears an acid group and may be at least partly neutralized,
   b) at least one crosslinker,
   c) at least one initiator,
   d) optionally one or more ethylenically unsaturated monomer copolymerizable with the monomer mentioned under a) and
   e) optionally one or more water-soluble polymer,
      drying a resulting polymer gel, grinding, classifying, and surface postcrosslinking the resulting polymer particles, wherein the surface postcrosslinked superabsorbent polymer particles are classified into an undersize, midsize, and oversize fraction, the superabsorbent polymer particles of the oversize fraction are deagglomerated using a roll crusher, and the deagglomerated superabsorbent polymer particles are recycled before or into the classification of the surface postcrosslinked superabsorbent polymer particles,
      wherein the surface postcrosslinked superabsorbent polymer particles are classified using a tumbling screen machine.

* * * * *